Patented May 1, 1951

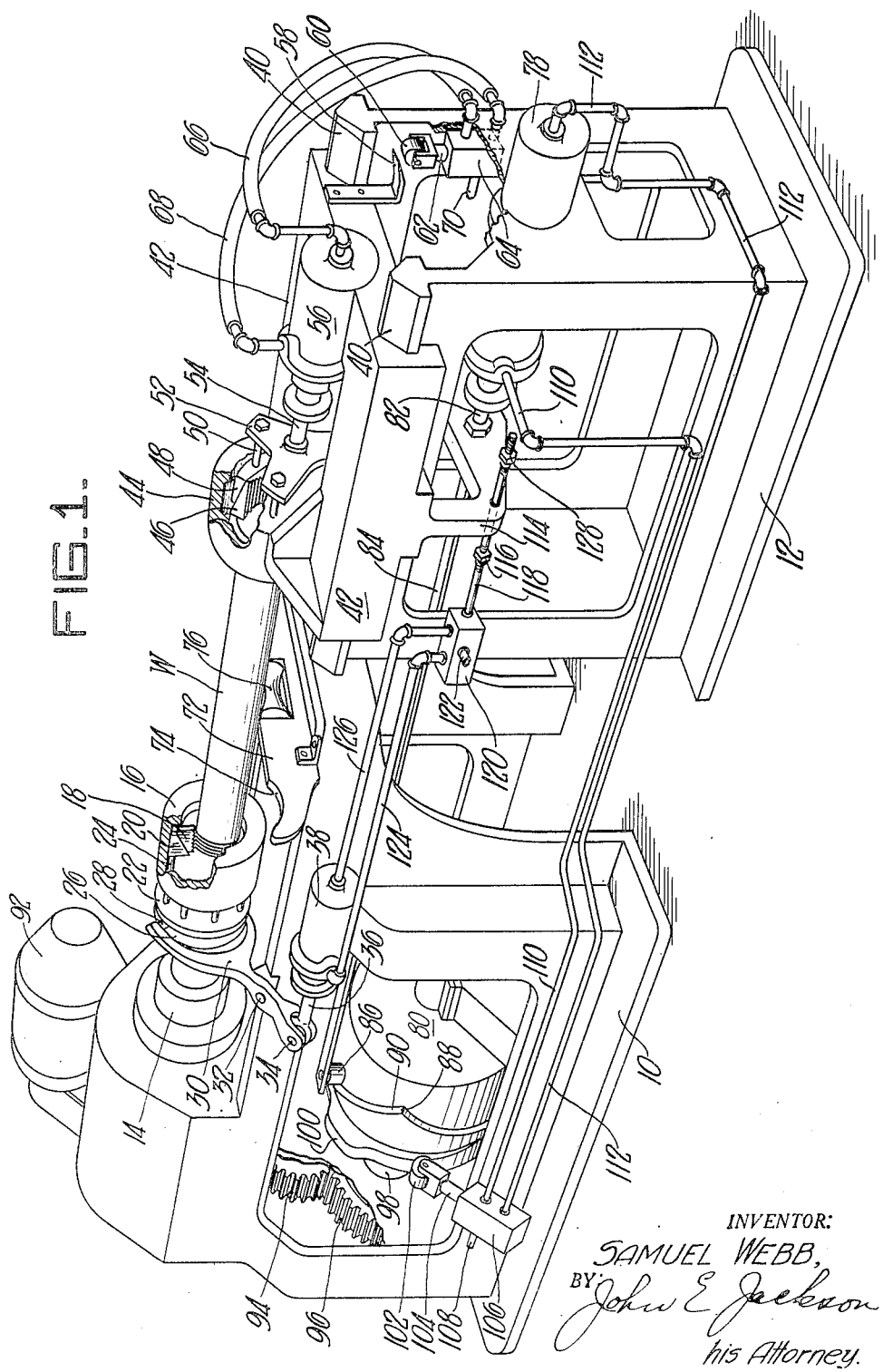

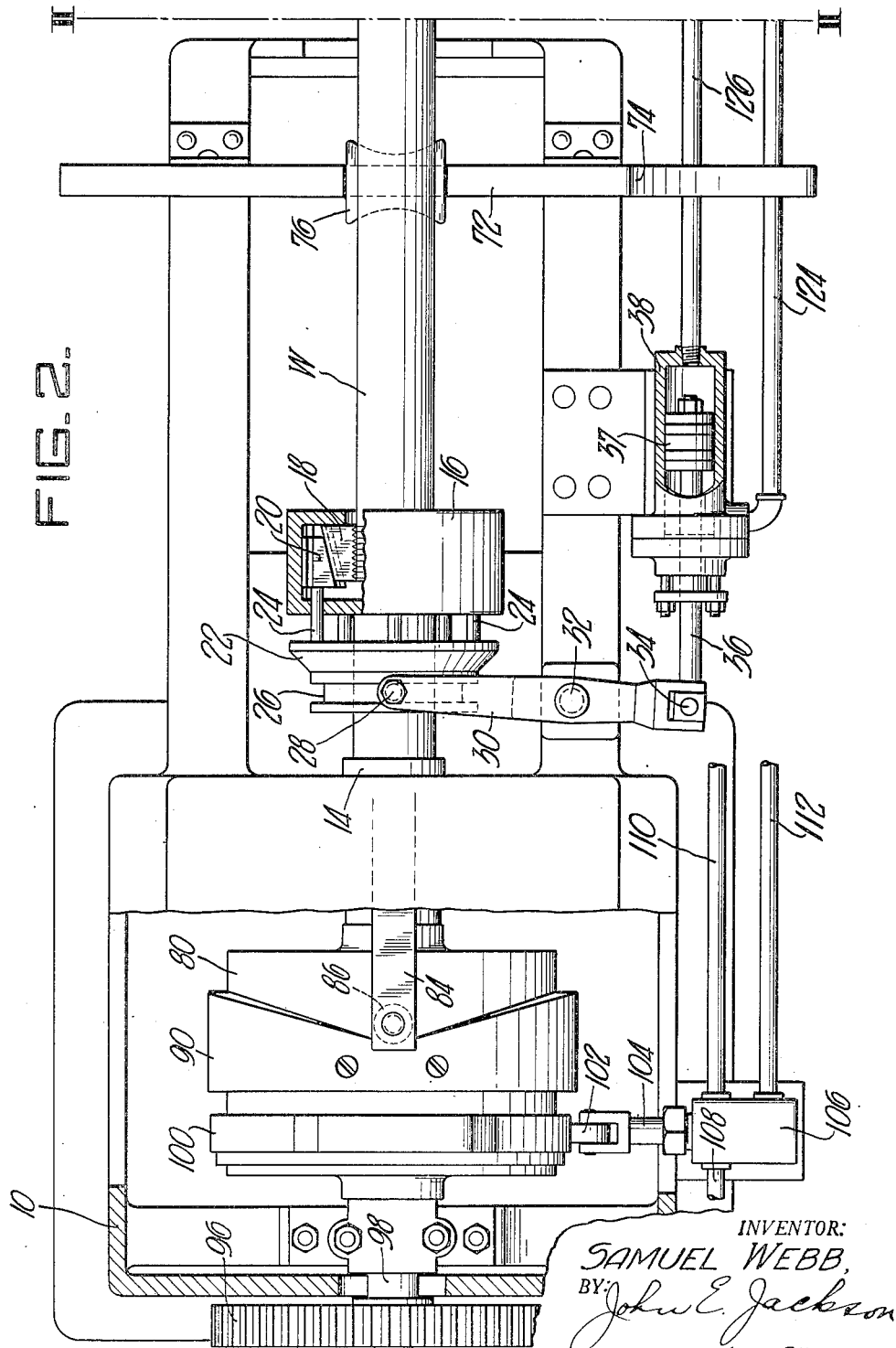

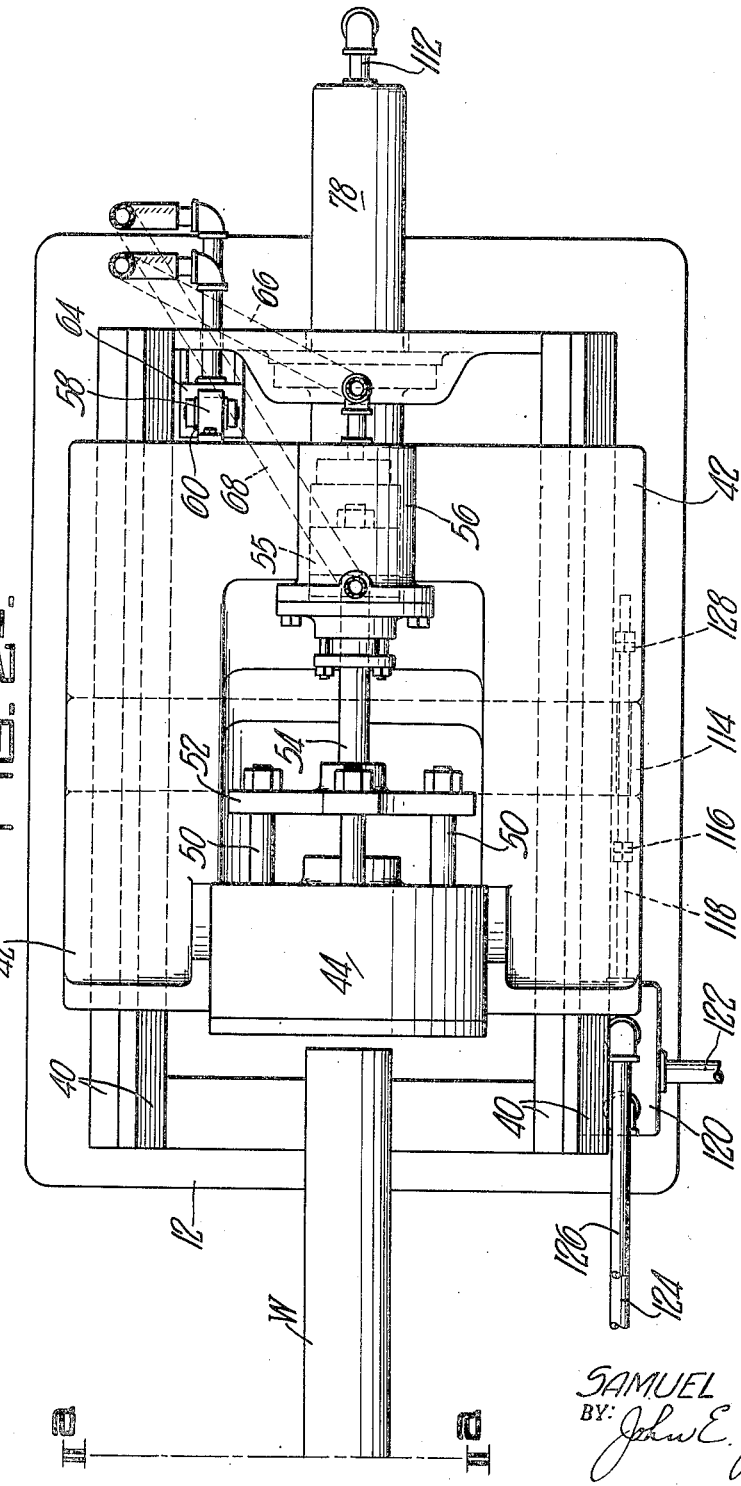

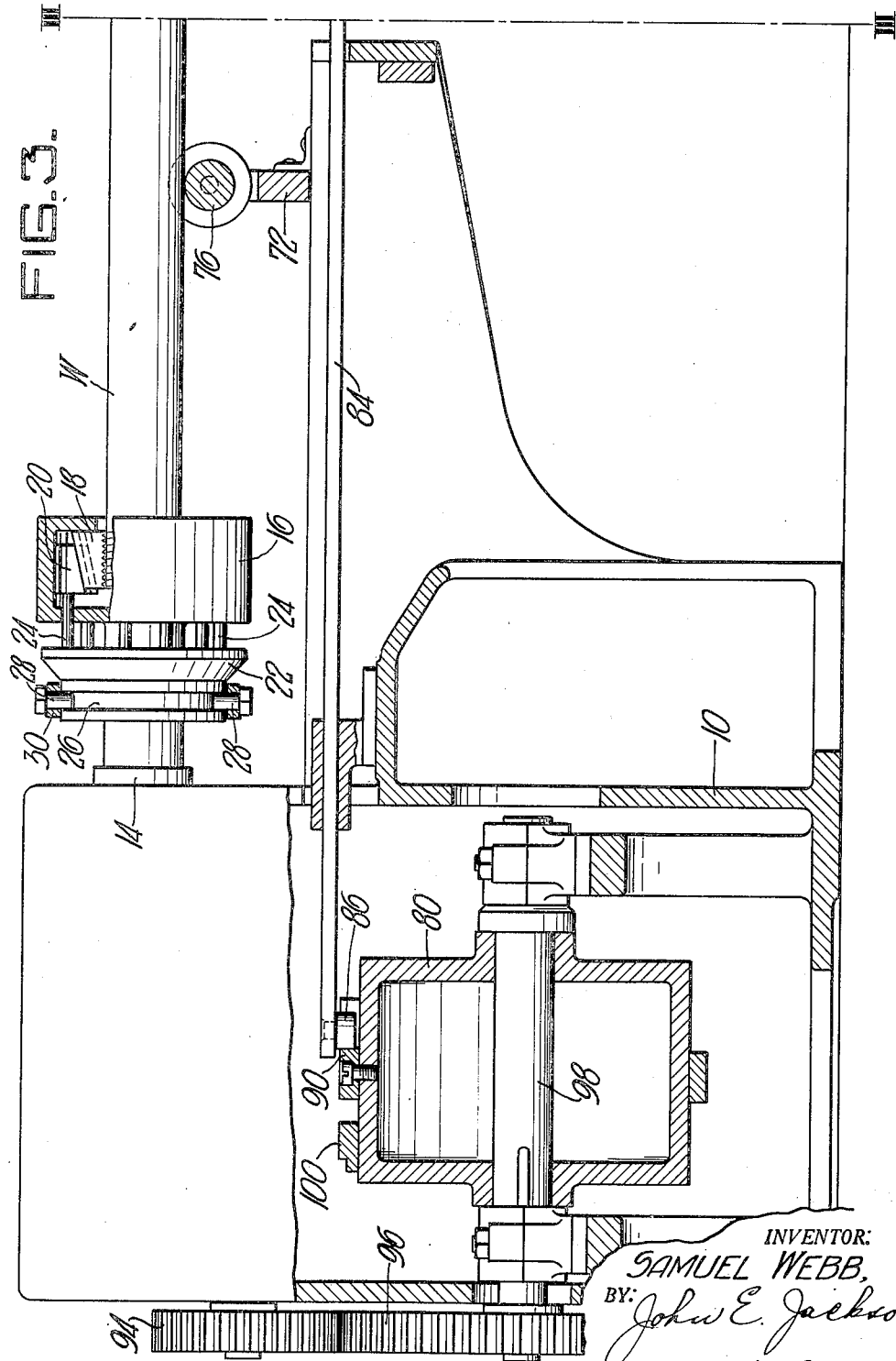

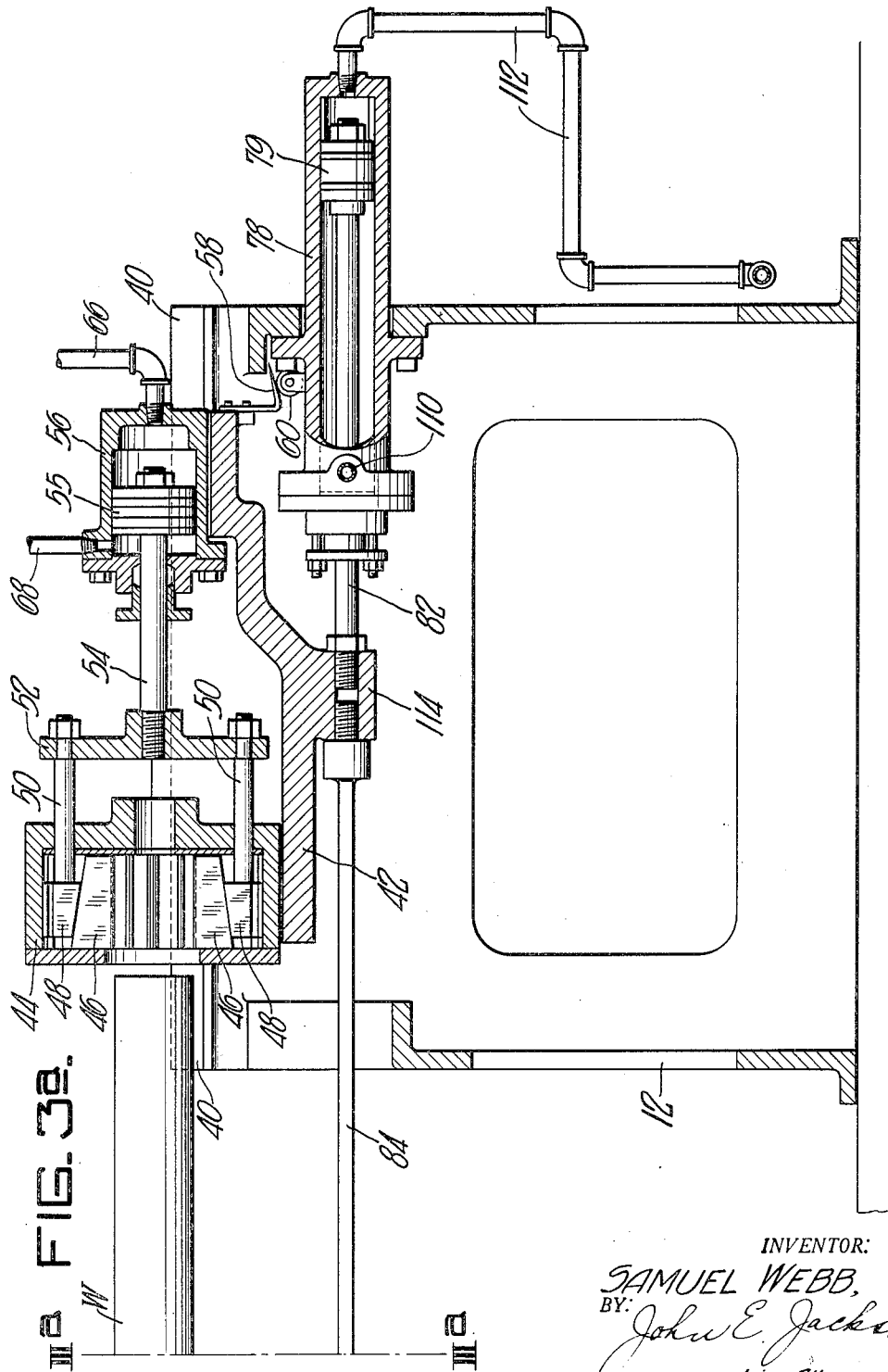

2,551,517

UNITED STATES PATENT OFFICE 2,551,517

PIPE-THREADING MACHINE

Samuel Webb, Pittsburgh, Pa., assignor to National Tube Company, a corporation of New Jersey Application December 30, 1944, Serial No. 570,684

5 Claims. (Cl. 10—89)

This invention aims to provide improved construction and arrangement in mechanism for effecting the rapid approach of a chuck and a cylindrical workpiece gripped thereby toward a threading head. While not limited thereto, the herein claimed invention is especially designed for use in connection with pipe or tube threading machines.

It has been proposed heretofore to provide cam-actuated mechanism for causing a chuck and workpiece held thereby quickly to approach the threading head and thereafter more slowly to move the chuck and workpiece toward the threading head at a rate commensurate with the pitch of the thread to be cut, but so far as I am aware, it has been the usual practice to employ a cam to cause both the rapid approach and the relatively slower feed upon engagement of the threading head with the work. Such cams, of course, are subject to wear after long continued use. This wear is reflected in the work as an objectionable shaving of the threads cut by the chasers of the threading head, thus resulting in improper thread profiles.

It is primarily an object of the present invention to overcome the deficiencies inherent in threading machines using wholly cam-operated mechanisms for imparting a quick approach and slower feeding movement to the chuck and the workpiece.

As will be more fully apparent from a detailed consideration of the following specification and drawings, my invention provides fluid-pressure means for moving the relatively heavy chuck and workpiece toward the threading head. I coordinate the operation of this means with a control cam in such a way that the cam is entirely relieved of the work necessary to cause the rapid approach of the chuck and workpiece from the starting position to its initial threading position. Thereafter the work of moving the chuck and workpiece during the threading operation is effected by said fluid-pressure means working in conjunction with the cam. The cam has a profile shoulder of a contour to suit the pitch of the particular thread being cut by the chasers in the threading head. The cam is thus entirely relieved of the work of imparting motion to the heavy chuck and workpiece, and of the work of overcoming friction in the chuck guides. Thus the cam merely serves in effect as a stop profiled to suit the pitch or lead of the particular thread being cut. As a result, inaccuracies in thread contour are eliminated, and a superior threaded product is produced.

For a complete understanding of the invention, reference is made to the following detailed disclosure, the accompanying drawings, and the appended claims.

In the drawings:

Figure 1 is a perspective view of a pipe threading machine embodying the present invention;

Figures 2 and 2ª, when joined on broken lines II—II and IIª—IIª, show a plan view of the machine with parts broken away and shown in section, in the interests of clarity; and Figures 3 and 3ª, when joined on the broken lines III—III and IIIª—IIIª, show a vertical longitudinal section through the center line of the machine.

Referring in detail to the accompanying drawings, a threading machine generally of a type which is known has spaced frame members 10 and 12, the frame member 10 including a spindle 14 on which is mounted a threading head 16 carrying thread-cutting chasers 18 adapted to be moved radially into and out of contact with a tube or like cylindrical workpiece W by wedges 20 movable axially in head 16. A shifting collar 22 has circumferentially spaced pins extending therefrom and secured to wedges 20. The collar has an annular groove 26 for receiving projections 28 extending inwardly from the spaced ends of a shifting fork 30 which is pivoted on frame member 10 at 32. The shank of the fork is slotted to receive a block pivoted by a pin 34 to a piston rod 36 on which is mounted a piston 37 reciprocable in a cylinder 38. The fork 30, collar 22, pins 24 and wedges 20 constitute expander-contractor means for chasers 18.

The frame member 12 has on the top thereof a pair of guides 40 which slidably support a carriage 42. A chuck 44 fixed on the carriage has circumferentially spaced gripping jaws 46 adapted to be actuated by wedges 48 connected by pins 50 to a spider 52. The spider is secured to a piston rod 54 provided with a piston 55 reciprocable within a chuck-actuating cylinder 56. At its right-hand end the carriage 42 has a dog 58 adapted to strike a roller 60 when the carriage is fully retracted. The roller 60 is mounted on a vertically reciprocable stem part of a chuck-control valve 64. This valve is connected by pipes 66 and 68 leading respectively to the outer and inner ends of the chuck-operating cylinder 56, and to a source of fluid pressure supply by a pipe 70. The valve construction and connections are such that when the carriage 42 reaches its fully retracted position, the dog 58 actuates the valve so that it admits air or other fluid pressure medium to the left-hand end of the cylinder 56 by way of pipe 68, thus retracting the spider 52 and releasing or opening the chuck jaws 46. As the carriage moves forward, the valve stem 62, being constantly urged upwardly as by a spring, rises and the valve admits air to the rear of the cylinder 56 by way of pipe 66, thus shifting the spider 52 to the left or toward the threading head 16 and causing wedges 48 to force the chuck jaws 46 inwardly and grip the workpiece W.

The pipes or workpieces W are fed manually into approximate axial alignment with the threading head 16 and chuck 44, being rolled into such position over a pair of inclined skids one of which is shown at 72. These skids 72 are in alignment with other inclined skids or trackways, and the pipe or other workpiece is temporarily held in depressions 74 in the skids while a previously fed pipe is being threaded in the machine. The skids 72 carry grooved positioning rollers 76 to facilitate moving the pipe endwise into a position to be gripped by the jaws 46 of the chuck. The only manual operation required is that of lifting the workpiece from the depressions 74, rolling it over the skids 72 and into the grooved rollers 76 and then moving it until the right-hand end enters the chuck 44. At this time the jaws 46 are retracted. Thereafter the carriage 42 is moved to the left and the jaws 48 automatically grip the workpiece while the carriage continues to move forwardly at a rapid rate under influence of mechanism to be presently described, which constitutes an important feature of my invention. The axial movement of the carriage from its retracted position to its thread-cutting position may be as much as 10 or 12 inches or more, depending upon the length of the workpiece. This initial movement is herein referred to as a quick approach. Thereafter the chuck moves at a much slower rate commensurate with the pitch or lead of the particular threads being cut on the workpiece by the chasers of the threading head.

In pipe-threading machines known previously both the rapid approach and subsequent slower feed were effected by the groove of a face cam. Because of the heavy nature of the parts and the rugged character of the work, the cam wore excessively which resulted in shaving the threads to an undesirable extent and impaired the accuracy of the ultimate threaded product. In my invention the movement of the chuck and the workpiece is effected by a fluid-pressure cylinder 78 and is controlled by a drum cam 80. A piston 79 reciprocable in cylinder 78 has a piston rod 82 threaded into one side of a transom 114 depending from carriage 42. A reach rod or stop bar 84 threaded into the other side of the transom has a follower roller 86 at its left-hand end adapted to engage the profile shoulder 90 of cam 80. The rod slides in a bearing on frame member 10. When the carriage 42 is fully retracted, roller 86 is spaced away from the cam shoulder 90 and the quick approach of the chuck 44 from its extreme retracted position to threading position, where the left-hand end of the work to be threaded is just about to engage the chasers 18 of the threading head, is effected solely by the fluid-pressure cylinder and its piston rod. During this initial quick approach, the cam shoulder serves as a stop, being positioned so that roller 86 contacts the high point 88 thereof. Thus the cam and the fluid-pressure cylinder work in conjunction to bring the left-hand end of the workpiece precisely to initial threading position.

Thereafter the movement of the carriage 42 and chuck 44 continues at a lower rate as the cam rotates, depending on the contour of the shoulder 90. This contour conforms to the desired lead or pitch of the particular thread to be cut by the chasers.

The spindle for the threading head is driven by a motor 92 through a gear train including gear 94 as shown, which drives a gear 96 secured to a shaft 98 on which the cam 80 is mounted. Cam 80 carries a ring 100 which coacts with a follower 102 secured to the stem 104 of a valve 106 connected to a source of fluid pressure by a pipe 108. The valve 106 controls the flow of air or other motive fluid through pipes 110 and 112 leading to the opposite ends of the cylinder 78. The ring 100 is of such contour that valve 106 is operated to supply air to the right-hand end of the cylinder 78 through pipe 112 first to cause the chuck to quickly approach the threading position and to hold roller 86 against cam shoulder 90 until the thread is entirely cut, and thereafter so as to admit air to the left-hand end of the cylinder 78 through pipe 110, and thus return the carriage 42 and chuck 44 to their retracted positions.

When the carriage reaches its extreme left-hand position, at the completion of the threading operation, the transom 114 on the carriage strikes an adjusting nut 116 on a valve rod 118, actuating a valve 120 controlling the flow of air or other motive fluid from a supply pipe 122. The valve 120 has pipes 124 and 126 connected to the right-hand and left-hand ends of the aforementioned cylinder 38. Thus when the carriage reaches the limit of its left-hand movement, air is admitted to the left-hand end of cylinder 38 by pipe 124, operating the shifting fork 30 which disengages the chasers 18 from the work. When the carriage 42 reaches its extreme retracted position, the depending transom 114 strikes a nut 128 adjustably secured to the valve rod 118, and shifts the valve mechanism 120 so as to admit air to the right-hand end of the cylinder 38 and thus rock the fork 30 to such position that the chasers are moved inwardly to engage the work upon its arrival at the threading head under influence of the quick approach chuck-operating mechanism above referred to.

In the particular embodiment of the invention illustrated, the chuck and the workpiece make a quick approach to the rotating threading head. It will be understood, however, that the principles of the invention may as readily be incorporated in the standard type of threading machine in which the chuck is rotatably mounted and in which the threading head is non-rotatable and mounted on a carriage shiftable toward and from such chuck. In short, the principle of the invention can be applied equally well to a machine in which the threading head and work-holding chuck are transposed from the positions shown in the embodiment of the invention illustrated. Both types of threading machines are in general use, and the quick approach mechanism of the present invention is applicable to either type.

While I have described in detail the particular embodiment of the invention herein illustrated, it is to be understood that various modifications and rearrangements of the component parts shown may be made without departure from the invention as set forth in the appended claims.

I claim:

1. A pipe-threading machine comprising a threading head mounted for rotation about a fixed axis and having radially movable thread-cutting chasers therein, a carriage movable along said axis having a chuck fixed thereon coaxial with said head adapted to hold a work-piece during the operation of said chasers on one end thereof, radially movable jaws in said chuck operable to grip the other end of the work-piece, a motor for shifting said carriage toward said head to thereby cause said one end of the work-piece to enter said head, a drum cam journaled with its axis parallel to the common axis of said head and chuck and having a profile shoulder therearound, means for driving said cam, a follower fixed to said carriage and adapted to strike said shoulder after an initial free movement of the carriage toward said cam by said motor, said motor serving thereafter to hold the follower against the shoulder whereby the rotation of the cam controls the further movement of the carriage toward said head by said motor, contracting means in said chuck engaging said jaws, a motor connected to said jaw-contracting means, means actuated by the initial movement of the carriage controlling said last-mentioned motor to actuate said jaw-contracting means, means in said head for expanding and contracting said chasers, a motor adjacent the head connected to said last-mentioned means for actuating it, and means operated by further movement of the carriage controlling said last-mentioned motor to cause contraction of the chasers as the work-piece is pushed toward them by said carriage.

2. The apparatus defined by claim 1 characterized by said cam being located adjacent said head and by a reach rod mounting said follower and extending from said carriage to said cam.

3. The apparatus defined by claim 1 characterized by said second-mentioned motor being coaxial with the chuck and a spider connected to the motor and to the jaw-contracting means.

4. The apparatus defined by claim 1 characterized by means controlling said first-mentioned motor and a ring on said cam operating said last-mentioned controlling means to cause reversal of the motor when said cam has rotated through an angle sufficient to permit the advance of the carriage necessary to complete a pipe-threading operation.

5. The apparatus defined by claim 1 characterized by said last-mentioned motor being offset from the axis of the head and chuck.

SAMUEL WEBB.

REFERENCES CITED

The following references are of record in the file of this patent:

UNITED STATES PATENTS

| Number | Name | Date |
|---|---|---|
| 1,299,883 | Warren | Apr. 8, 1919 |
| 1,381,542 | Clay | June 14, 1921 |
| 1,619,200 | Ferris | Mar. 1, 1927 |
| 1,657,813 | Andrews | Jan. 21, 1928 |
| 1,747,111 | Galloway et al. | Feb. 11, 1930 |
| 1,890,495 | Carlson | Dec. 13, 1932 |
| 1,914,085 | Gabriel | June 13, 1933 |
| 2,054,018 | Gilchrist | Sept. 8, 1936 |
| 2,067,626 | Benninghoff | Jan. 12, 1937 |
| 2,082,929 | Yager et al. | June 8, 1937 |
| 2,159,207 | Godfriaux | May 23, 1939 |
| 2,210,531 | Engelbaugh | Aug. 6, 1940 |
| 2,318,177 | Mathas | May 4, 1943 |
| 2,360,906 | Smith | Oct. 24, 1944 |